US011072955B2

(12) United States Patent
Hotomi et al.

(10) Patent No.: US 11,072,955 B2
(45) Date of Patent: Jul. 27, 2021

(54) HINGE AND HINGE MONITORING METHOD

(71) Applicant: SIMOTEC CO., LTD., Higashiosaka (JP)

(72) Inventors: Hideo Hotomi, Higashiosaka (JP); Takashi Shimonishi, Higashiosaka (JP)

(73) Assignee: SIMOTEC CO., LTD., Higashiosaka (JP)

( * ) Notice: Subject to any disclaimer, the term of this patent is extended or adjusted under 35 U.S.C. 154(b) by 0 days.

(21) Appl. No.: 16/650,401

(22) PCT Filed: Sep. 20, 2018

(86) PCT No.: PCT/JP2018/034806
§ 371 (c)(1),
(2) Date: Mar. 25, 2020

(87) PCT Pub. No.: WO2019/059274
PCT Pub. Date: Mar. 28, 2019

(65) Prior Publication Data
US 2020/0291704 A1 Sep. 17, 2020

(30) Foreign Application Priority Data
Sep. 25, 2017 (JP) .............................. JP2017-184235

(51) Int. Cl.
*E05D 11/00* (2006.01)
*E05D 3/02* (2006.01)

(52) U.S. Cl.
CPC ............ *E05D 11/0081* (2013.01); *E05D 3/02* (2013.01); *E05Y 2400/44* (2013.01); *E05Y 2400/50* (2013.01)

(58) Field of Classification Search
CPC ............. E05Y 2400/44; E05Y 2400/50; E05D 11/0081; E05D 3/02
See application file for complete search history.

(56) References Cited

U.S. PATENT DOCUMENTS

| 7,756,619 B2 | 7/2010 | Ichikawa et al. |
| 8,653,982 B2 * | 2/2014 | Yulkowski ............... E05F 15/70 340/686.1 |

(Continued)

FOREIGN PATENT DOCUMENTS

| CN | 1880793 A | 12/2006 |
| EP | 0867225 A2 | 9/1998 |

(Continued)

OTHER PUBLICATIONS

International Search Report; International Application No. PCT/JP2018/034806; International Filing Date Sep. 20, 2018, Date of Mailing of ISR dated Dec. 18, 2018; 6 pages.

(Continued)

*Primary Examiner* — Jeffrey O'Brien
(74) *Attorney, Agent, or Firm* — Cantor Colburn LLP

(57) ABSTRACT

A hinge is provided which can more reliably prevent malfunction and breakdown and which enables efficiently performing repair and inspection operations. The hinge, provided with a first wing member linked to a first linked object and a second wing member linked to a second linked object, and rotatably linking the second linked object to the first linked object, is provided with a sensor which detects prescribed change in the external environment in the hinge or around the hinge, and a control unit which externally transmits, over a communication network, information on the change in the external environment detected by the sensor, wherein the sensor is configured from at least one of: a rotation speed sensor for detecting the rotation speed of the second wing member relative to the first wing member; a vibration sensor for detecting the amount of vibration; a load sensor for detecting load; an angle sensor for detecting the opening angle of the second wing member relative to the first wing member; a temperature sensor for detecting tem- (Continued)

perature; and an air pressure sensor for detecting atmospheric pressure.

2 Claims, 4 Drawing Sheets

(56) References Cited

U.S. PATENT DOCUMENTS

| | | | |
|---|---|---|---|
| 8,786,435 | B2 | 7/2014 | Barnett et al. |
| 8,829,809 | B2 | 9/2014 | Barnett et al. |
| 10,229,567 | B2 * | 3/2019 | Ricks ..................... E05D 11/00 |
| 10,415,294 | B2 * | 9/2019 | Yulkowski ........... G07C 5/0816 |
| 10,663,321 | B1 * | 5/2020 | Martin ................ E05D 11/0081 |
| 2006/0167656 | A1 | 7/2006 | Shimonishi |
| 2006/0287788 | A1 | 12/2006 | Ichikawa et al. |
| 2009/0243509 | A1 | 10/2009 | Barnett et al. |
| 2011/0006893 | A1 | 1/2011 | Barnett et al. |
| 2011/0006896 | A1 | 1/2011 | Barnett et al. |
| 2011/0012532 | A1 | 1/2011 | Barnett et al. |
| 2011/0012541 | A1 | 1/2011 | Finch |
| 2011/0012730 | A1 | 1/2011 | Finch et al. |
| 2017/0260783 | A1 | 9/2017 | Crolley |

FOREIGN PATENT DOCUMENTS

| | | |
|---|---|---|
| EP | 0867225 A3 | 12/2000 |
| JP | H10263435 A | 10/1998 |
| JP | H1139586 A | 2/1999 |
| JP | 2005269552 A | 9/2005 |
| JP | 2008107863 A | 5/2008 |
| JP | 2008177653 A | 7/2008 |
| JP | 2009237046 A | 10/2009 |
| JP | 2010109589 A | 5/2010 |
| JP | 2010200397 A | 9/2010 |
| JP | 2011512044 A | 4/2011 |
| JP | 2011100353 A | 5/2011 |
| WO | 2004047042 A1 | 6/2004 |
| WO | 2015194577 A1 | 12/2015 |

OTHER PUBLICATIONS

International Search Report; International Application No. PCT/JP2018/034809; International Filing Date Sep. 20, 2018; Date of Mailing of ISR dated Dec. 18, 2018; 2 pages.
International Preliminary Report on Patentability for International Application No. PCT/JP2018/034806; dated Jan. 16, 2020.
International Preliminary Report on Patentability for International Application No. PCT/JP2018/034809; dated Oct. 11, 2019.
CNIPA Office Action for corresponding CN Application No. 201880062307.0; dated May 21, 2021.

* cited by examiner

HINGE AND HINGE MONITORING METHOD

CROSS REFERENCE TO RELATED APPLICATIONS

This is the U.S. national stage of application No. PCT/JP2018/034806, filed on Sep. 20, 2018. Priority under 35 U.S.C. § 119(a) and 35 U.S.C. § 365(b) is claimed from Japanese Application No. 2017-184235, filed Sep. 25, 2017, the disclosure of which is also incorporated herein by reference.

TECHNICAL FIELD

The present invention relates to a hinge for openably linking a second linked object to a first linked object, and a hinge monitoring method.

BACKGROUND ART

There has been known a technique concerning a hinge that includes a first wing member linked to a first linked object and a second wing member linked to a second linked object, the hinge rotatably linking the second linked object to the first linked object (c.f. Patent Literature 1).

Specific examples of the use in which the hinge is provided include: a use in which an original pressing plate is openably linked to the body of a multi-function machine which includes an original reader; a use in which a hatch (lid) for exchanging a toner cartridge is openably linked to the body of a printer; a use in which a screen part is openably linked to the body of a laptop computer or a mobile phone; a use in which a hood is openably linked to the body of a car; a use in which a toilet seat is openably linked to a toilet; a use in which a lid is openably linked to a pot of a rice cooker; and a use in which a window or a door is openably linked to an opening that communicates with the inside of a furnace or a workroom.

As for the above hinge, an external person such as a maintenance contractor has grasped the state of the hinge such as a defect or a failure or the surrounding conditions of the hinge mainly through periodically conducted inspection work, notification made by a user, or the like.

CITATIONS LIST

Patent Literature

Patent Literature 1: JP-A 2009-237046 Gazette

SUMMARY OF INVENTION

Technical Problems

However, as for the above hinge, the state of the hinge or the surrounding conditions of the hinge greatly vary depending on the installed environment, the use state, or the like. In addition, there are variations in inspection technique and attention among inspectors, users, and the like who are to grasp the state of the hinge or the surrounding conditions of the hinge.

There has thus been a case where, at the time of conduction of the periodic inspection work or reception of the notification from the user, it is already too late or a large-scale repair is required. There has also been a case where, by conduction of the periodic inspection work, reception of the notification from the user, or the like, the inspection work, the repair work, or the like is conducted even when the repair work or the like is not required.

The present invention has been made in view of the circumstances as described above, and it is an object of the present invention to provide a hinge and a hinge monitoring method, which can more reliably prevent a defect, a failure, and the like from occurring and efficiently conduct repair and inspection work.

Solutions to Problems

The problem to be solved by the present invention is as described above, and solutions to the problem will be described below.

That is, the solution is a hinge including: a first wing member linked to a first linked object; and a second wing member linked to a second linked object, the hinge being rotatably linking the second linked object to the first linked object, the hinge including: a sensor that detects a predetermined environment change in the hinge or a predetermined external environment around the hinge; and a control unit that transmits, through a communication network to an outside, information on the predetermined environment change in the hinge or the predetermined external environment change around the hinge detected by the sensor; and a control unit that transmits, through a communication network to the outside, information on the external environment change around the hinge detected by the sensor, in which the sensor is constituted by at least any one of a rotational speed sensor that detects a rotational speed of the second wing member with respect to the first wing member, a vibration sensor that detects an amount of vibration, a load sensor that detects a load, an angle sensor that detects an opening angle of the second wing member with respect to the first wing member, a temperature sensor that detects a temperature, and an atmospheric pressure sensor that detects atmospheric pressure, the control unit determines whether or not the predetermined environment change in the hinge or a predetermined external environment change around the hinge detected by the sensor is higher than the predetermined threshold, when the predetermined environment change in the hinge or the predetermined external environment change around the hinge detected by the sensor is higher than the predetermined threshold for a plurality of times within a predetermined time, the control unit transmits the information on the change in the external environment detected by the sensor in the case of the change being higher than the predetermined threshold and the information on the time when the sensor has detected the change in the external environment to the outside, the predetermined threshold can be set in a plurality of stages, and the control unit can also be set to determine whether or not the predetermined environment change in the hinge or a predetermined external environment change around the hinge detected by the sensor is higher than the predetermined threshold in each of the plurality of stages.

The solution is a monitoring method for a hinge that includes a first wing member linked to a first linked object, and a second wing member linked to a second linked object, the hinge being rotatably linking the second linked object to the first linked object, a sensor provided in the hinge, detecting a predetermined environment change in the hinge or a predetermined external environment change around the hinge; and a control unit transmitting, through a communication network to the outside, information on the change in the external environment detected by the sensor, in which the sensor is constituted by at least any one of a rotational speed sensor that detects a rotational speed of the second wing member with respect to the first wing member, a vibration sensor that detects an amount of vibration, a load sensor that detects a load, an angle sensor that detects an opening angle of the second wing member with respect to the first wing member, a temperature sensor that detects a temperature, and an atmospheric pressure sensor that detects atmospheric pressure, the control unit determines whether or not the predetermined environment change in the hinge or a predetermined external environment change around the hinge detected by the sensor is higher than the predetermined threshold, when the predetermined environment change in the hinge or the predetermined external environment change around the hinge detected by the sensor is higher than the predetermined threshold for a plurality of times within a predetermined time, the control unit transmits the information on the change in the external environment detected by the sensor in the case of the change being higher than the predetermined threshold and the information on the time when the sensor has detected the change in the external environment to the outside, the predetermined threshold can be set in a plurality of stages, and the control unit can also be set to determine whether or not the predetermined environment change in the hinge or a predetermined external environment change around the hinge detected by the sensor is higher than the predetermined threshold in each of the plurality of stages.

Advantageous Effects of Invention

As the effects of the present invention, the following effects can be obtained.

That is, according to the present invention, it is possible to more reliably prevent a defect, a failure, and the like from occurring, and it is possible to efficiently conduct repair and inspection work.

DESCRIPTION OF EMBODIMENT

Next, a hinge according to an embodiment of the present invention will be described with reference to FIGS. 1 to 4.

The hinge links one member (first linked object) of two members to the other member (second linked object) rotatably (openably).

Specific examples of the use in which the hinge is provided include: a use in which an original pressing plate is openably linked to the body of a multi-function machine which includes an original reader; a use in which a hatch (lid) for exchanging a toner cartridge is openably linked to the body of a printer; a use in which a screen part is openably linked to the body of a laptop computer or a mobile phone; a use in which a hood is openably linked to the body of a car; a use in which a toilet seat is openably linked to a toilet; a use in which a lid is openably linked to a pot of a rice cooker; and a use in which a window or a door is openably linked to an opening that communicates with the inside of a furnace or a workroom.

Next, a box member 2 will be described as an example of one in which the hinge is provided.

Figure 1:
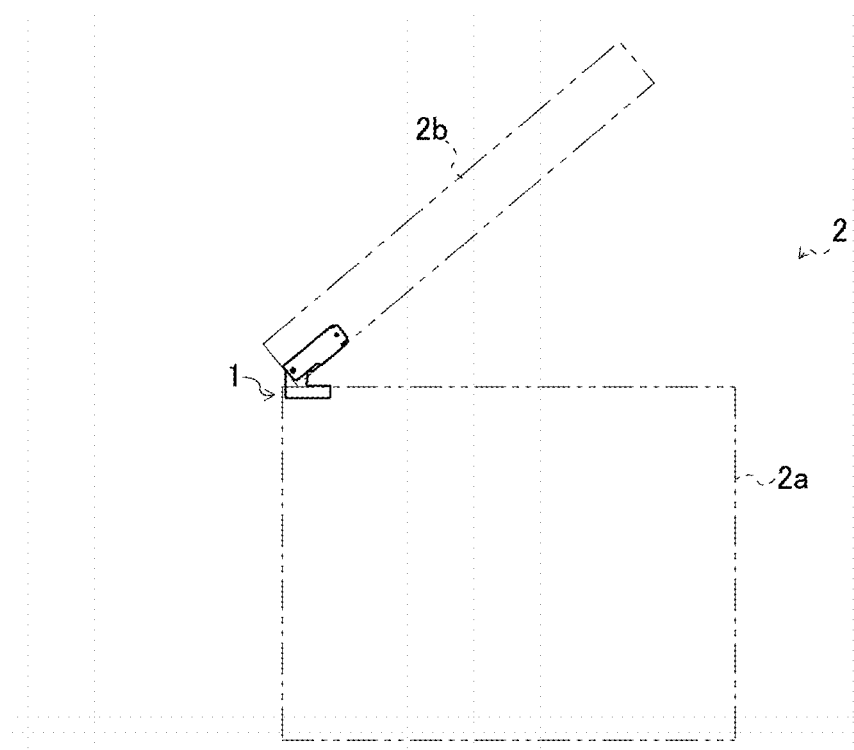
FIG. 1 is a right side view showing a box member provided with a hinge according to an embodiment of the present invention.
Figure 2:
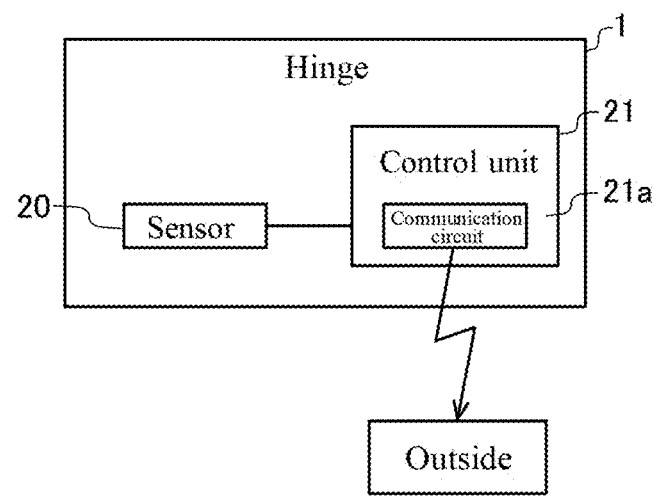
FIG. 2 is a block diagram showing the hinge.
Figure 3:
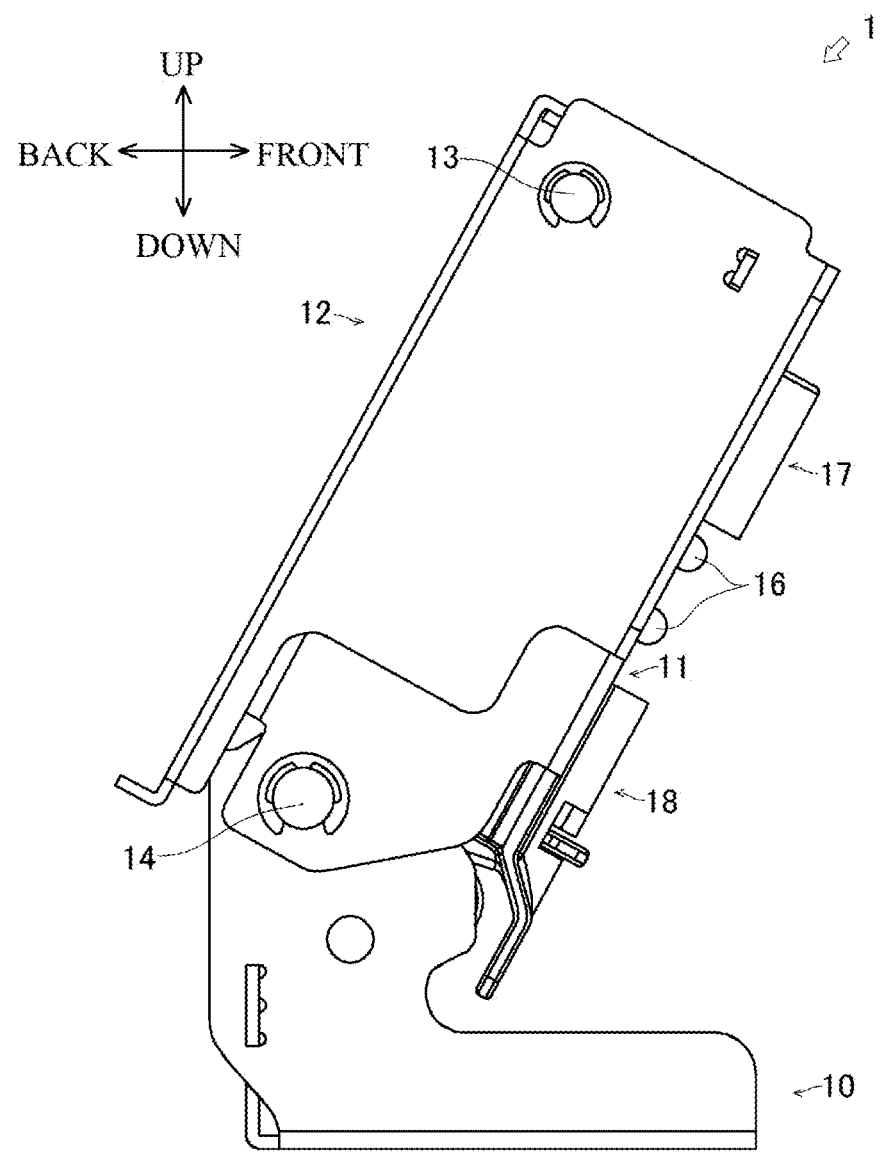
FIG. 3 is a right side view showing the hinge.
Figure 4:
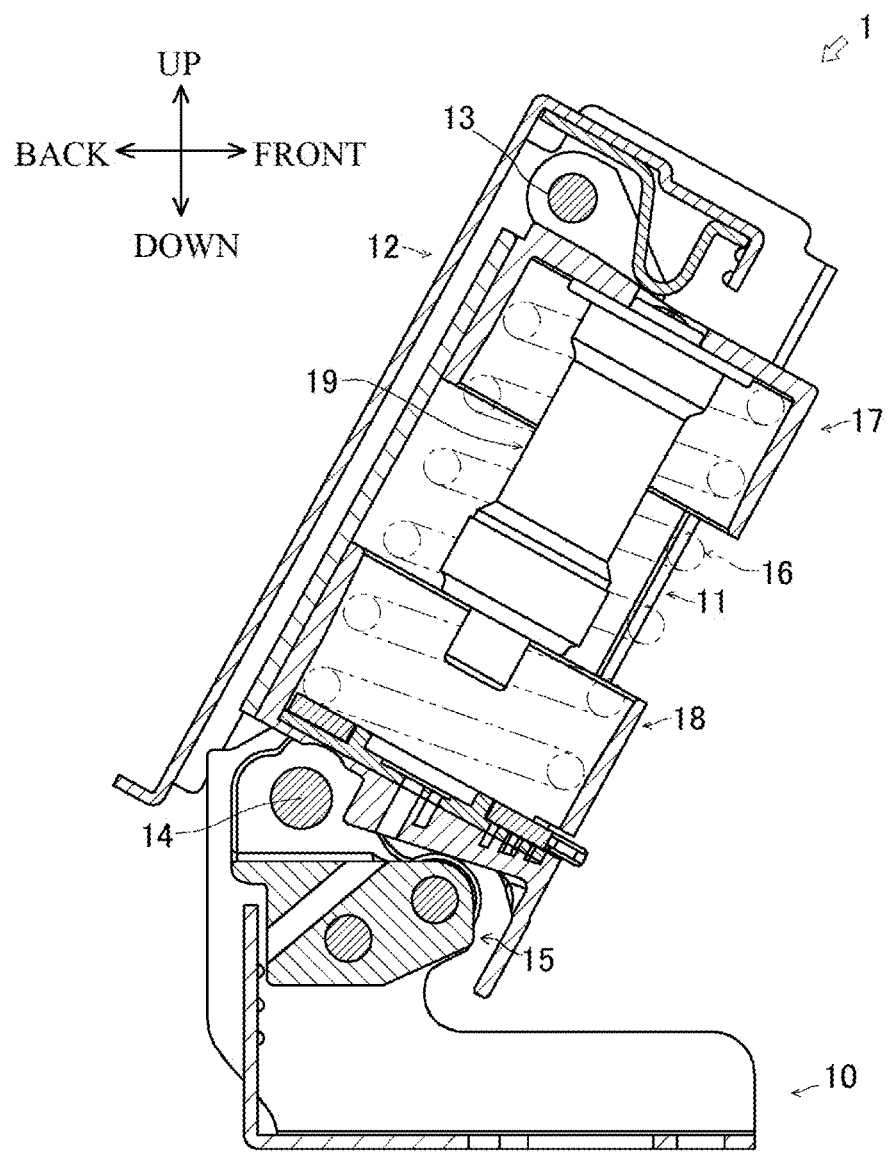
FIG. 4 is a sectional view showing the hinge.

As shown in FIG. 1, the box member 2 includes a body 2a and a lid 2b, and the lid 2b is rotatably linked to the body 2a via the hinge.

The body 2a is an embodiment of the first linked object to which the hinge is linked. The body 2a has an opening in a part (upper part) thereof, and is configured so that a predetermined thing can be housed therein or predetermined work can be conducted inside.

The lid 2b is an embodiment of the second linked object to which the hinge is linked. The lid 2b is disposed above the body 2a, and opens and closes the opening of the body 2a by rotating relatively to the body 2a.

Note that the one in which the hinge is provided is not limited to such a configuration but broadly includes ones in which one member is rotatably linked to the other member via the hinge.

Next, a hinge 1 will be described as an example of the hinge.

As shown in FIGS. 1 to 4, the hinge 1 rotatably links the lid 2b to the body 2a of the box member 2. The hinge 1 includes a lower fixing member 10, an intermediate member 11, an upper fixing member 12, an upper rotary shaft 13, a lower rotary shaft 14, a cam member 15, a spring 16, an upper slider 17, a lower slider 18, and a damper 19.

The lower fixing member 10 is an embodiment of the first wing member according to the present invention. A combination of the intermediate member 11, the upper fixing member 12, and the upper rotary shaft 13 is an embodiment of the second wing member according to the present invention.

The upper fixing member 12 is fixed to the lid 2b of the box member 2.

The upper rotary shaft 13 rotatably links the intermediate member 11 and the upper fixing member 12. The upper rotary shaft 13 is rotatably inserted through a through-hole formed in the intermediate member 11 and a through-hole formed in the upper fixing member 12.

The lower rotary shaft 14 is a rod-shaped member that rotatably links the lower fixing member 10 and the intermediate member 11. The lower rotary shaft 14 is rotatably inserted through a through-hole formed in the lower fixing member 10 and a through-hole formed in the intermediate member 11.

The cam member 15 has a through-hole, and the lower rotary shaft 14 is inserted through the through-hole.

The spring 16 extends to energize the intermediate member 11 to the lower fixing member 10 in a direction in which the lid 2b (to which the upper fixing member 12 has been fixed) opens with respect to the body 2a (to which the lower fixing member 10 has been fixed), and then supports the weight of the lid 2b. The spring 16 is made of a compression coil spring obtained by spirally forming a round bar made of spring steel.

The upper slider 17 is a member that supports the upper end of the spring 16. The upper slider 17 is housed in a space inside the intermediate member 11 and can slide along the longitudinal direction of the intermediate member 11.

The lower slider 18 is a member that supports the lower end of the spring 16. The lower slider 18 is housed inside the intermediate member 11 and can slide along the longitudinal direction of the intermediate member 11.

The damper 19 rotates the second wing member (the combination of the intermediate member 11, the upper fixing member 12, and the upper rotary shaft 13) with respect to the lower fixing member 10 in a direction in which the lid 2b of the box member 2 closes the body 2a, and when the angle formed between the lower surface of the lid 2b and the upper surface of the body 2a is small, the damper 19 reduces the rotational speed of the second wing member with respect to the lower fixing member 10. The damper 19 is a hydraulic damper 19, having one end fixed to the upper slider 17 and being disposed at a position surrounded by the spring 16.

The second wing member rotates with respect to the lower fixing member 10 in a direction in which the lid 2b of the box member 2 closes the body 2a, and when the angle between the lower surface of the lid 2b and the upper surface of the body 2a is reduced, the other end of the damper 19 comes into contact with the lower slider 18, and the damper 19 contracts in its longitudinal direction. When the damper 19 contracts in its longitudinal direction, the rotational speed of the second wing member with respect to the lower fixing member 10 is reduced due to viscous resistance of hydraulic oil filled in the damper 19.

Note that the hinge 1 is not limited to such a configuration but broadly includes ones that link one member (first linked object) of two members to the other member (second linked object) rotatably (openably).

Further, the hinge 1 includes a sensor 20 and a control unit 21.

The sensor 20 detects a change in predetermined external environment in the hinge 1 or around the hinge 1. The sensor 20 is constituted by at least any one of: a rotational speed sensor that detects the rotational speed of the lid 2b with respect to the body 2a (the rotational speed of the second wing member with respect to the first wing member) (e.g., a magnetic encoder, an optical encoder, a gyro sensor, etc.); a vibration sensor that detects the amount of vibration of the hinge 1 (the first wing member or the second wing member); a load sensor that detects a load applied to a predetermined location of the hinge 1 (e.g., the upper slider 17 or the lower slider 18 supporting the spring 16); an angle sensor that detects the opening angle of the lid 2b with respect to the body 2a (the opening angle of the second wing member with respect to the first wing member) (e.g., a magnetic encoder, an optical encoder, a gyro sensor, etc.); a temperature sensor that detects a temperature (the temperature in the hinge 1 or the temperature around the hinge 1); and an atmospheric pressure sensor that detects atmospheric pressure around the hinge 1.

The sensor 20 is provided in a predetermined space where the sensor 20 can detect the change in the external environment inside the hinge 1 (e.g., in the first wing member or in the second wing member). Note that the sensor 20 can also be disposed outside the hinge 1.

The control unit 21 controls various operations of the hinge 1 (sensor 20). The control unit 21 includes a storage device that stores various pieces of information, a clock function (e.g., a real-time clock), a communication circuit 21a that transmits various pieces of information to the outside by wire or wirelessly, an analog-to-digital conversion circuit, a micro-processing unit (MPU), and the like. The control unit 21 stores, into the storage device, information on the open/closed state of the second wing member, information on the change in the external environment detected by the sensor 20, information on the time when the sensor 20 has detected the change in the external environment, and the like. The control unit 21 transmits the information on the open/closed state of the second wing member, the information on the change in the external environment detected by the sensor 20, the information on the time when the sensor 20 has detected the change in the external environment, and the like from the communication circuit 21a to the outside (e.g., a management server, external communication equipment, a management center, etc.) through a communication network such as the internet. Further, the control unit 21 is configured to store information on the operation mode of the sensor 20 received from the outside, and to be operable based on instruction information received from the outside (information on timing at which the sensor 20 detects the change in the external environment, information on a predetermined threshold for determination by the control unit 21, information on the timing at which the control unit 21 transmits the information on the change in the external environment detected by the sensor 20, etc.).

Instead of being provided in the hinge 1, the control unit 21 can also be constituted by a microcomputer or the like built in the box member 2, or constituted by connection equipment such as a personal computer (PC) electrically connected to the box member 2. The hinge 1 can be made compact by disposing the control unit 21 outside the hinge 1 as described above.

Further, the control unit 21 can also be configured to transmit the information on the change in the external environment detected by the sensor 20, the information on the time when the sensor 20 detected a change in the external environment, and the like, from the communication circuit 21a to connection equipment (e.g., a beacon device, a wireless module, etc.) disposed inside the hinge 1 or outside the hinge 1 and connected to the control unit 21, and transmit the information to the outside via the connection equipment.

The sensor 20 constantly performs the operation of detecting the change in the external environment. The meaning of "the sensor 20 constantly performs the operation of detecting the change in the external environment" includes, in addition to a state in which the sensor 20 constantly detects the change in the external environment in a strict sense, a state in which the sensor 20 performs the operation of detecting the change in the external environment at extremely short intervals (e.g., at intervals of less than one second).

Each time the sensor 20 performs the operation of detecting the change in the external environment, the control unit 21 transmits the information on the change in the external environment detected by the sensor 20 and the information on the time when the sensor 20 has detected the change in the external environment to the outside. An external person receives the information on the change in the external environment detected by the sensor 20 and the information on the time when the sensor 20 has detected the change in the external environment via the management server or the like or directly from the hinge 1.

In this manner, it is possible to cause an external person at a remote location to constantly grasp the state of the hinge or the surrounding conditions of the hinge based on the information on the change in the external environment detected by the sensor 20, the information on the time when the sensor 20 has detected the change in the external environment, and the like. Therefore, according to the hinge 1, it is possible to more reliably prevent a defect, a failure, and the like from occurring, and it is possible to efficiently conduct repair and inspection work.

The sensor 20 can also be set to perform the operation of detecting the change in the external environment every predetermined time (at least every several seconds (e.g., every 10 minutes or every 180 minutes)). With such a configuration, it is possible to reduce the power consumption generated due to the operation by the sensor 20 to detect the change in the external environment while transmitting the information on the change in the external environment detected by the sensor 20, and the like to the outside, every predetermined time.

Further, the sensor 20 can also be set to perform the operation of detecting the change in the external environment only when the second wing member is in the closed state. With such a configuration, for example, in a case where various pieces of equipment such as the box member 2 provided with the hinge 1 are ones that greatly exhibit a change in the external environment despite there being no defect of the hinge 1 when the second wing member is in the open state, it is possible to prevent the external transmission of such confusing information at the time of the second wing member being in the open state.

Further, the sensor 20 can also be set to perform the operation of detecting the change in the external environment only when the second wing member is in the closed state. With such a configuration, for example, in a case where various pieces of equipment such as the box member 2 provided with the hinge 1 are ones that greatly exhibit a change in the external environment despite there being no defect of the hinge 1 when the second wing member is in the open state, it is possible to prevent the external transmission of such confusing information at the time of the second wing member being in the open state.

The control unit 21 can also be set to transmit, to the outside, the information on the change in the external environment detected by the sensor 20 and the information on the time when the sensor 20 has detected the change in the external environment every predetermined time (at least every several seconds (e.g., every 10 minutes, every 180 minutes, or every several days)). With such a configuration, while the information on the change in the external environment detected by the sensor 20, and the like is transmitted to the outside every predetermined time, to cause the external person at the remote location to grasp the state of the hinge or the surrounding conditions of the hinge every predetermined time, it is possible to reduce power consumption generated due to the operation by the control unit 21 to transmit the information on the change in the external environment, and the like to the outside.

The control unit 21 can also be set to determine whether or not the change in the external environment detected by the sensor 20 is higher than a predetermined threshold. The predetermined threshold is set in advance and stored into the storage device of the control device, and its value can also be changed by external communication or the like.

At this time, it can also be set such that, when the change in the external environment detected by the sensor 20 is higher than the predetermined threshold, the control unit 21 transmits the information on the change in the external environment detected by the sensor 20 in the case of the change being higher than the predetermined threshold and the information on the time when the sensor 20 has detected the change in the external environment to the outside. With such a configuration, when the change in the external environment detected by the sensor 20 exceeds the predetermined threshold (e.g., only when the change in the external environment detected by the sensor 20 has a high degree of abnormality), while the information on the change in the external environment detected by the sensor 20, and the like are transmitted to the outside, to cause the external person at the remote location to grasp the state of the hinge or the surrounding conditions of the hinge and that the change in the external environment detected by the sensor 20 has exceeded the predetermined threshold, it is possible to reduce power consumption generated due to the operation by the control unit 21 to transmit the information on the change in the external environment, and the like to the outside.

For example, when the hinge 1 is provided on a laptop computer or the like and the sensor 20 is constituted by a rotational speed sensor capable of detecting the rotational speed of the second wing member with respect to the first wing member (e.g., the rotational speed of the screen part with respect to the body of the laptop computer), in a case where the rotational speed of the second wing member with respect to the first wing member detected by the sensor 20 is higher than a predetermined threshold, the control unit 21 transmits information on the rotation speed of the second wing member with respect to the first wing member detected by the sensor 20 and information on the time when the sensor 20 has detected the rotation speed of the second wing member with respect to the first wing member to the outside. In this manner, it is possible to cause the external person to grasp that a defect might have occurred in which the rotational speed of the second wing member with respect to the first wing member has become faster or slower than an initial value that is considered to be in a favorable state due to long-term use or the like. As thus described, it is possible to cause the external person to grasp that there is a possibility that the rotational speed of the second wing member with respect to the first wing member has become faster or slower due to a defect (a defect such as deviation of the hinge 1 or deterioration of the spring 16 or the damper 19), and it is possible to encourage the maintenance or the like.

Further, for example, when the hinge 1 is provided on a laptop computer or the like and is constituted by a vibration sensor capable of detecting the amount of vibration of the hinge 1, in a case where the amount of vibration of the hinge 1 detected by the sensor 20 (e.g., the amplitude, the amount of vibration, or the like of the second wing member with respect to the first wing member, etc.) becomes a value higher than a predetermined threshold, the control unit 21 transmits information on the amount of vibration of the hinge 1 detected by the sensor 20 and information on the time when the sensor 20 has detected the amount of vibration of the hinge 1 to the outside. In this manner, it is possible to cause the external person to grasp that a defect might have occurred in which the amount of vibration of the hinge 1 has become a value higher than an initial value that is considered to be in a favorable state due to long-term use or the like. As thus described, it is possible to cause the external person to grasp that there is a possibility that the amount of vibration of the hinge 1 has become a high value due to a defect (a defect such as deviation of the hinge 1, loosening of the linkage portion formed by the upper rotary shaft 13 between the intermediate member 11 and the upper fixing member 12, or loosening of the linkage portion formed by the lower rotary shaft 14 between the lower fixing member 10 and the intermediate member 11), and it is possible to encourage the maintenance or the like.

Further, for example, when the hinge 1 is provided on a laptop computer or the like and the sensor 20 is constituted by a load sensor that detects a load applied to a predetermined location of the hinge 1, in a case where the load detected by the sensor 20 (e.g., a load applied to the upper slider 17 or the lower slider 18 supporting the spring 16 of the hinge 1 when the screen part rotates with respect to the body of the laptop computer) becomes a value higher than a predetermined threshold, the control unit 21 transmits information on the load detected by the sensor 20 and information on the time when the sensor 20 has detected the load to the outside. In this manner, it is possible to cause the external person to grasp that a defect might have occurred in which the load applied to the predetermined location of the hinge 1 has become higher than an initial value that is considered to be in a favorable state due to long-term use or the like. As thus described, it is possible to cause the external person to grasp that there is a possibility that the load applied to the predetermined location of the hinge 1 has become high due to a defect (a defect such as deviation of the hinge 1 or that the load of the lid 2b applied to the first wing member due to deterioration of the spring 16 becomes larger than an expected load), and it is possible to encourage the maintenance or the like.

For example, when the hinge 1 is provided on a laptop computer or the like and the sensor 20 is constituted by an opening angle sensor capable of detecting the opening angle of the second wing member with respect to the first wing member (e.g., the opening angle of the screen part with respect to the body of the laptop computer) and when the second wing member is stopped in the state of opening at a preset angle, in a case where the preset angle of the second wing member with respect to the first wing member detected by the sensor 20 deviates from a predetermined threshold, the control unit 21 transmits information on the opening angle of the second wing member with respect to the first wing member detected by the sensor 20 and information on the time when the sensor 20 has detected the opening angle of the second wing member with respect to the first wing member to the outside. In this manner, it is possible to cause the external person to grasp that a defect might have occurred in which the opening angle of the second wing member with respect to the first wing member deviates from an initial value (preset opening angle) that is considered to be in a favorable state due to long-term use or the like As thus described, it is possible to cause the external person to grasp that there is a possibility that the opening angle of the second wing member with respect to the first wing member deviates from the preset one due to a defect (a defect such as deviation of the hinge 1 or breakage of the linkage portion formed by the upper rotary shaft 13 between the intermediate member 11 and the upper fixing member 12 or the linkage portion formed by the lower rotary shaft 14 between the lower fixing member 10 and the intermediate member 11), and it is possible to encourage the maintenance or the like.

For example, when the sensor 20 is constituted by a temperature sensor capable of detecting the temperature of the hinge 1, in a case where the temperature of the hinge 1 (in the hinge 1 or around the hinge 1) detected by the sensor 20 is higher or lower than a predetermined threshold, the control unit 21 transmits information on the temperature of the hinge 1 detected by the sensor 20 and information on the time when the sensor 20 has detected the temperature of the hinge 1 to the outside. In this manner, it is possible to cause the external person to grasp that a defect might have occurred in which the temperature of the hinge 1 has become high or low, such as that abnormal friction has occurred between the members constituting the hinge 1 to generate heat or that cool air is leaking from the inside of the freezer or the like, due to long-term use or the like. As thus described, it is possible to cause the external person to grasp that there is a possibility that the temperature of the hinge 1 has become high or low due to a defect (a defect such as deviation of the hinge 1), and to encourage the maintenance or the like.

For example, when the sensor 20 is constituted by an atmospheric pressure sensor capable of detecting atmospheric pressure around the hinge 1, in a case where the atmospheric pressure around the hinge 1 (in the hinge 1 or around the hinge 1) detected by the sensor 20 is higher or lower than a predetermined threshold, the control unit 21 transmits information on the atmospheric pressure around the hinge 1 detected by the sensor 20 and information on the time when the sensor 20 has detected the atmospheric pressure around the hinge 1 to the outside. In this manner, it is possible to cause the external person to grasp that the hinge 1 in a pot or the equipment provided with the hinge 1 is being used in an environment with higher atmospheric pressure than that in an assumed environment (pressure inside a rice cooker or the like is abnormally high even with the lid 2b in the closed state etc.) or lower atmospheric pressure than that.

The predetermined threshold can be set in a plurality of stages, and the control unit 21 can also be set to determine whether or not the change in the external environment detected by the sensor 20 is higher than the predetermined threshold in each of the plurality of stages. For example, the predetermined thresholds in the plurality of stages are configured in two stages: a first-stage threshold having a relatively low value and a second-stage threshold having a relatively high value. With such a configuration, it is possible to cause the external person to sequentially grasp a state where the degree of abnormality of the change in the external environment detected by the sensor 20 is relatively low and a state where the degree of abnormality is relatively high.

It is also possible to set such that the predetermined threshold is changed in accordance with the state of the hinge 1 (e.g., the open/closed state of the second wing member, the opening/closing angle of the second wing member, a time zone, etc.), and the control unit 21 determines whether or not the change in the external environment detected by the sensor 20 is higher than the predetermined threshold having been changed above. For example, the predetermined threshold is set to the relatively low first-stage threshold when the second wing member is in the closed state, and the predetermined threshold is set to the relatively high second-stage threshold when the second wing member is in the open state. With such a configuration, for example, the information on the change in the external environment detected by the sensor 20 and the information on the time when the sensor 20 has detected the change in the external environment are transmitted to the outside in a state where the degree of abnormality of the change in the external environment detected by the sensor 20 is relatively low when the second wing member is in the closed state, and are transmitted to the outside in a state where the degree of abnormality of the change in the external environment detected by the sensor 20 is relatively high when the second wing member is in the open state.

It is also possible to set such that in a case where the control unit 21 determines whether or not the change in the external environment detected by the sensor 20 is higher than the predetermined threshold, when the control unit 21 determines that "the change in the external environment detected by the sensor 20 is higher than a predetermined threshold" a plurality of times within a predetermined time (e.g., three times within 10 minutes), the control unit 21 transmits the information on the change in the external environment detected by the sensor 20 when the change is higher than the predetermined threshold and the information on the time when the sensor 20 has detected the change in the external environment to the outside. With such a configuration, when the degree of abnormality of the change in the external environment detected by the sensor 20 is not actually high, it is possible to prevent the control unit 21 from determining that the change in the external environment detected by the sensor 20 based on noise or the like is higher than the predetermined threshold and from transmitting the information to the outside.

It is also possible to set such that in a case where the control unit 21 determines whether or not the change in the external environment detected by the sensor 20 is higher than the predetermined threshold, the control unit 21 performs the operation of determining whether or not the change in the external environment detected by the sensor 20 is higher than the predetermined threshold only when the second wing member is in the closed state. With such a configuration, for example, in a case where various pieces of equipment such as the box member 2 provided with the hinge 1 are ones that greatly exhibit a change in the external environment despite there being no defect when the second wing member is in the open state, it is possible to prevent the external transmission of such confusing information at the time of the second wing member being in the open state.

It is also possible to set such that in a case where the control unit 21 determines whether or not the change in the external environment detected by the sensor 20 is higher than the predetermined threshold, the control unit 21 performs the operation of determining whether or not the change in the external environment detected by the sensor 20 is higher than the predetermined threshold only when the second wing member is in the open state (when the second wing member has a predetermined opening/closing angle). With such a configuration, for example, in a case where various pieces of equipment such as the box member 2 provided with the hinge 1 are ones that greatly exhibit a change in the external environment despite there being no defect when the second wing member is in the closed state, it is possible to prevent the external transmission of such confusing information at the time of the second wing member being in the open state.

INDUSTRIAL APPLICABILITY

The present invention is utilized for a hinge that openably links a second linked object to a first linked object, and for a hinge monitoring method.

REFERENCE SIGNS LIST

1 Hinge
2 Box member
2a Body
2b Lid
10 Lower fixing member
11 Intermediate member
12 Upper fixing member
13 Upper rotary shaft
14 Lower rotary shaft
15 Cam member
16 Spring
17 Upper slider
18 Lower slider
19 Damper
20 Sensor
21 Control unit

The invention claimed is:

1. A hinge comprising:
a first wing member linked to a first linked object; and a second wing member linked to a second linked object, the hinge rotatably linking the second linked object to the first linked object,
a sensor that detects a predetermined environment change in the hinge or a predetermined external environment change around the hinge; and
a control unit that transmits, through a communication network to an outside, information on the predetermined environment change in the hinge or the predetermined external environment change around the hinge in the external environment detected by the sensor, wherein
the sensor is constituted by at least any one of a rotational speed sensor that detects a rotational speed of the second wing member with respect to the first wing member, a vibration sensor that detects an amount of vibration, a load sensor that detects a load, an angle sensor that detects an opening angle of the second wing member with respect to the first wing member, a temperature sensor that detects a temperature, and an atmospheric pressure sensor that detects atmospheric pressure,
the control unit determines whether or not the predetermined environment change in the hinge or the predetermined external environment change around the hinge detected by the sensor is higher than a predetermined threshold, when the predetermined environment change in the hinge or the predetermined external environment change around the hinge detected by the sensor is higher than the predetermined threshold a plurality of times within a predetermined time, the control unit transmits the information on the predetermined environment change or the predetermined external environment change detected by the sensor in the case of the change being higher than the predetermined threshold and information on the time when the sensor has detected the predetermined environment change or the predetermined external environment change to the outside,
the predetermined threshold configured to be set in a plurality of stages, and
the control unit configured to be set to determine whether or not the predetermined environment change in the hinge or the predetermined external environment change around the hinge detected by the sensor is higher than the predetermined threshold in each of the plurality of stages.

2. A monitoring method for a hinge that includes:
a first wing member linked to a first linked object, and a second wing member linked to a second linked object, a hinge rotatably linking the second linked object to the first linked object, a sensor provided in the hinge, detecting a predetermined environment change in the hinge or a predetermined external environment change around the hinge; and a control unit transmitting, through a communication network to an outside, information on the predetermined environment change in the hinge or the predetermined external environment change around the hinge detected by the sensor, wherein
the sensor is constituted by at least any one of a rotational speed sensor that detects a rotational speed of the second wing member with respect to the first wing member, a vibration sensor that detects an amount of vibration, a load sensor that detects a load, an angle sensor that detects an opening angle of the second wing member with respect to the first wing member, a temperature sensor that detects a temperature, and an atmospheric pressure sensor that detects atmospheric pressure, the control unit determines whether or not the predetermined environment change in the hinge or the predetermined external environment change around the hinge detected by the sensor is higher than a predetermined threshold, when the predetermined environment change in the hinge or the predetermined external environment change around the hinge detected by the sensor is higher than the predetermined threshold a plurality of times within a predetermined time, the control unit transmits the information on the predetermined environment change or the predetermined external environment change detected by the sensor in the case of the change being higher than the predetermined threshold and information on the time when the sensor has detected the predetermined environment change or the predetermined external environment change to the outside, the predetermined threshold configured to be set in a plurality of stages, and the control unit configured to be set to determine whether or not the predetermined environment change in the hinge or the predetermined external environment change around the hinge detected by the sensor is higher than the predetermined threshold in each of the plurality of stages.

\* \* \* \* \*